United States Patent
Klein et al.

(10) Patent No.: US 12,534,859 B2
(45) Date of Patent: Jan. 27, 2026

(54) TANDEM ROLLER FOR COMPACTING AN UNDERLYING GROUND

(71) Applicant: BOMAG GMBH, Boppard (DE)

(72) Inventors: Thomas Klein, Boppard (DE); Tobias Kreutz, Boppard (DE)

(73) Assignee: BOMAG GMBH, Boppard (DE)

( * ) Notice: Subject to any disclaimer, the term of this patent is extended or adjusted under 35 U.S.C. 154(b) by 630 days.

(21) Appl. No.: 18/053,017

(22) Filed: Nov. 7, 2022

(65) Prior Publication Data

US 2023/0143004 A1     May 11, 2023

(30) Foreign Application Priority Data

Nov. 8, 2021   (DE) ...................... 10 2021 212 546.8

(51) Int. Cl.
*E01C 19/23*     (2006.01)
*B62D 15/02*    (2006.01)
*B62D 33/073*  (2006.01)

(52) U.S. Cl.
CPC ........ *E01C 19/235* (2013.01); *B62D 15/0205* (2013.01); *B62D 33/073* (2013.01)

(58) Field of Classification Search
CPC ...... E01C 19/004; E01C 19/235; E01C 19/26; E01C 19/268; E01C 2301/30; B62D 15/0205; B62F 33/073
See application file for complete search history.

(56) References Cited

U.S. PATENT DOCUMENTS

| 6,361,246 B1 * | 3/2002 | Tamura | E01C 19/27 |
| | | | 404/122 |
| 12,180,659 B2 * | 12/2024 | Berenz | B60K 11/04 |
| 2017/0355330 A1 | 12/2017 | Berg et al. | |

(Continued)

FOREIGN PATENT DOCUMENTS

| CN | 104032654 | 9/2014 |
| CN | 112144347 | 12/2020 |

(Continued)

OTHER PUBLICATIONS

Office Action from related Chinese Appln. No. 202211385926.8, dated May 9, 2024. English translation attached.

*Primary Examiner* — Gary S Hartmann
(74) *Attorney, Agent, or Firm* — Grossman, Tucker, Perreault & Pfleger, PLLC

(57) ABSTRACT

A tandem roller for compacting an underlying ground, comprising a machine frame supported by a front compaction drum and a rear compaction drum. The rear compaction drum is spaced apart from the front compaction drum in a longitudinal machine direction, and an operator platform with a driver's seat. The driver's seat is displaceable by an adjusting device from an operating position at a center of the operator platform with respect to a horizontal extension of the operator platform transverse to a forward direction in a direction of at least one side of the tandem roller transversely to the longitudinal machine direction to at least one defined first operating position and in the same direction to the side to at least one defined second operating position, the defined second operating position being spaced farther apart from the center of the operator platform than the defined first operating position.

20 Claims, 4 Drawing Sheets

(56) References Cited

U.S. PATENT DOCUMENTS

| | | | |
|---|---|---|---|
| 2017/0356139 A1 | 12/2017 | Berg et al. | |
| 2020/0094887 A1* | 3/2020 | Johnson | B62D 33/073 |
| 2021/0131043 A1 | 5/2021 | Klein et al. | |
| 2022/0106745 A1* | 4/2022 | Erdtmann | E01C 19/48 |

FOREIGN PATENT DOCUMENTS

| | | | | |
|---|---|---|---|---|
| CN | 106828214 B | * | 12/2023 | B60N 2/24 |
| CN | 116084240 B | * | 11/2024 | B62D 33/073 |
| DE | 19813474 | | 10/1999 | |
| DE | 102019002442 | | 10/2020 | |
| DE | 102021212519 A1 | * | 5/2023 | E01C 19/26 |
| EP | 0845557 | | 6/1998 | |
| EP | 0935025 | | 8/1999 | |
| EP | 1961607 | | 8/2008 | |
| EP | 2357281 | | 8/2011 | |
| EP | 2775032 | | 9/2014 | |
| EP | 3258014 B1 | * | 9/2018 | E01C 19/27 |
| EP | 3092341 | | 5/2019 | |
| EP | 3988715 B1 | * | 3/2024 | E01C 19/48 |
| EP | 4353905 A1 | * | 4/2024 | E01C 19/4853 |
| JP | H0738205 U | * | 7/1995 | |
| JP | 8-134824 | | 5/1996 | |
| JP | 2022157014 A | * | 10/2022 | |

\* cited by examiner

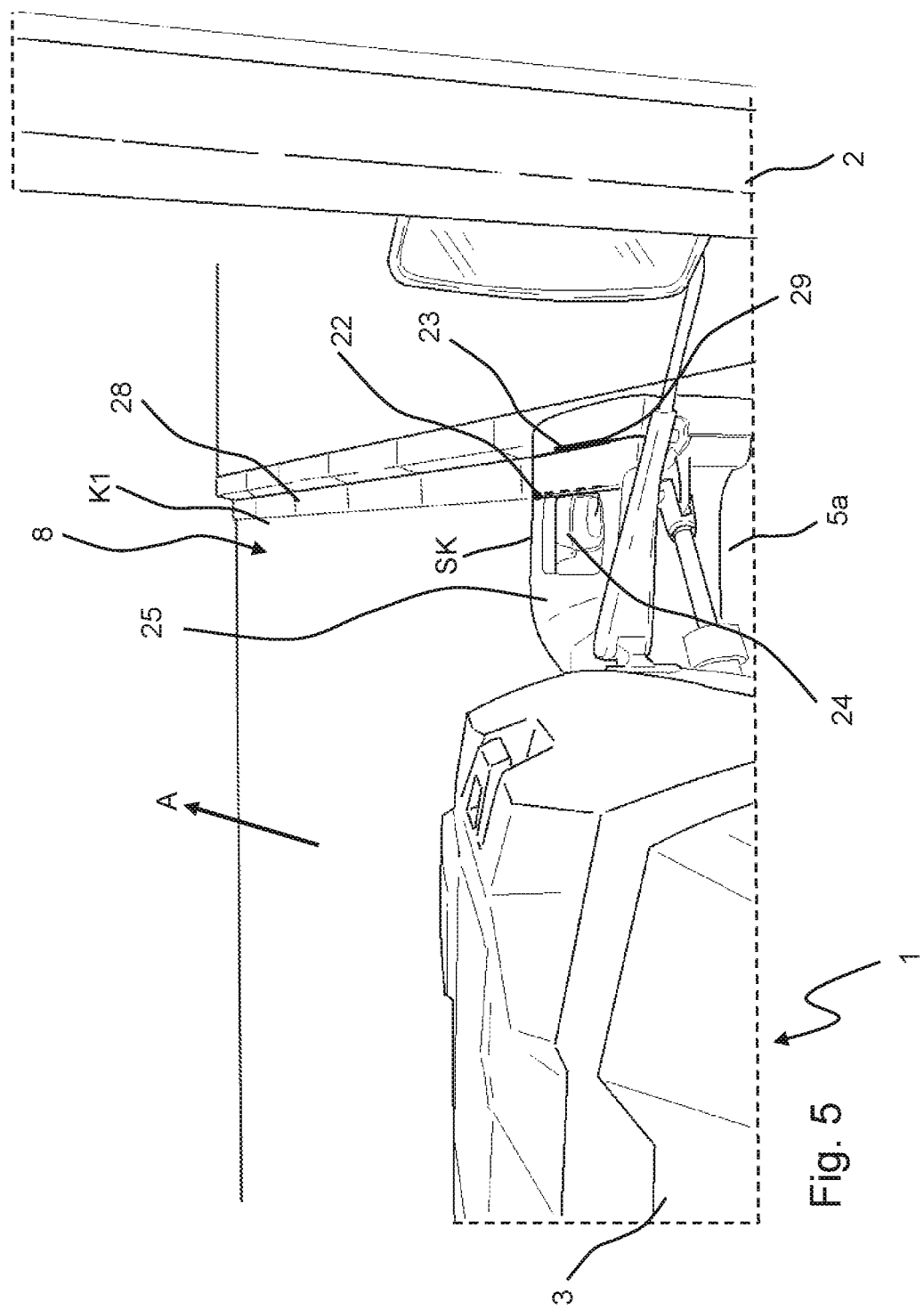

TANDEM ROLLER FOR COMPACTING AN UNDERLYING GROUND

FIELD

The invention relates to a tandem roller for compacting an underlying ground.

BACKGROUND

Tandem rollers belong to the group of self-propelled ground compaction machines and are used, for example, in road construction for asphalt compaction. Such ground compaction machines are described, for example, in EP 3092341 A1, EP 0845557 A1 and DE 102019002442 A1. Tandem rollers comprise a front compaction drum with respect to a direction of travel and a rear compaction drum with respect to the direction of travel. When the tandem roller travels straight ahead, the front and rear compaction drums thus run one behind the other. Hereinafter, directional information always refers to straight ahead travel of the tandem roller. It will be appreciated that the front compaction drum and the rear compaction drum are steerable for steering movements of the tandem roller. For this purpose, the tandem roller may be configured as a pivot-steered tandem roller or as an articulated tandem roller. The special features of pivot-steered tandem rollers are described in EP0935024A2. The drive energy required for traveling and working operation is provided by a drive motor, for example an internal combustion engine or electric motor.

Tandem rollers may have front and/or rear drums configured as split drums. It is also known to replace one of the compaction drums by a rubber wheel set with at least 3 rubber wheels arranged coaxially to each other (so-called combination rollers). Excitation devices may be arranged in the interior of the front and/or rear drum to increase the compaction effect achievable with the tandem roller. Such excitation devices are usually so-called imbalance exciters.

The front and rear compaction drums support a machine frame of the tandem roller, which in particular forms the main support structure. The front and rear compaction drums are each mounted on the machine frame such that they can rotate about a rotation axis running horizontally and transversely to the forward direction. Viewed in a direction of travel, an operator platform is further arranged between the two compaction drums, from which the operator can operate the tandem roller in traveling and working operation. The operator platform may be configured as a driver's cab, in particular comprising two lateral access doors arranged opposite each other such that the operator can enter the interior of the driver's cab from both sides (right or left with respect to a direction of travel). The lateral access doors are adjustable between a closed position closing the driver's cab and an open position allowing passage through the cab opening closable by the lateral access door. The lateral access doors further often each comprise at least one side window that is part of the access door and is adjustable on the respective lateral access door between an open and a closed window position. Such a arrangement is described, for example, in EP3468820A1.

In practical use, such ground compaction machines are often operated in reversing operation, i.e., the current direction of travel of the tandem roller is regularly reversed by the driver, for example, in order to be able to drive over the same ground area several times and/or to be able to drive over a defined ground area systematically, for example, based on a rolling plan. Forward travel hereinafter refers to the tandem roller moving, as seen from the operator platform, in the direction of the front compaction drum. Rearward travel, on the other hand, denotes a direction opposite to forward travel. The direction of travel refers to the direction of movement in which the tandem roller is currently moving. In order to increase the operating comfort for the driver in view of this reversing operation, it is already known to configure the driver's seat rotatable such that the operator on the operator platform can look straight ahead during both rearward travel and forward travel. To this end, it is known to configure the driver's seat itself and/or a mounting bracket of the driver's seat in the floor of the operator platform to be rotatable about a vertical axis so that by rotating the driver's seat accordingly, the driver can look forward in the direction of travel as seen from the driver's position both during rearward travel and forward travel. Such a device is disclosed, for example, in EP0935025A2. The driver's seat may further comprise an operating console, in particular comprising an armrest, which may have one or more operating devices, for example for steering the tandem roller. The armrest may be adjustable and/or rotatable together with the driver's seat.

When operating tandem rollers, there are often situations in which the driver has to guide the machine very precisely along a longitudinally extending edge running in the direction of travel, for example. Such an application situation exists, for example, when the tandem roller is to travel to the edge of an asphalt mat and/or along a gutter or curb without hitting it and thereby causing damage to the gutter or curb. The challenge for the operator of the tandem roller then consists in guiding the end face of the front compaction drum lying in front of him in the direction of travel as close as possible to the edge delimiting the ground area to be compacted to the side, but without under any circumstances driving over this edge. Particularly with large and heavy tandem rollers, for example with a machine weight of more than 5 t, the view to the end face of the compaction drum from the operator platform may be difficult and obscured by machine parts. A first improvement, particularly for these operating situations, has been achieved for tandem rollers in that the driver's seat can be configured to be adjustable, in particular displaceable, horizontally and transversely to the direction of travel of the tandem roller from the center of the operator platform to the right and left sides, as disclosed, for example, in EP1961607A1. The center of the operator platform designates a position of the operator's seat in the center of the maximum extension of the operator platform in a horizontal plane transverse to the direction of travel. In the case of tandem rollers, the driver's seat may often be adjustable, in particular displaceable, from this central position to the right and left. For this purpose, practically infinitely variable adjusting devices are often used, so that the operator is more or less free to choose within an adjustment range of the driver's seat in which displacement position he wants to lock the driver's seat and operate the tandem roller. In this manner, it is possible for the driver to shift his viewing position within the operator platform to the side of the tandem roller where he wants to guide the tandem roller along an obstacle with the end face of the respective compaction drum.

For the objective definition of the viewing conditions for a driver seated in the driver's seat, reference is made in the context of the present invention to the seat index point SIP according to the EN ISO 5353 standard, which can be clearly determined according to the specifications of this standard. Details of this are given in the standard to which reference is hereby made, in particular the definitions contained therein concerning the seat index point and the possibilities given therein for determining the seat index point. Starting from the seat index point SIP, the eye point AP is determined or defined by it, which is preferably located 680 mm vertically above the seat index point SIP. This is defined accordingly in the ISO 5006 2017-04 standard, which is also referred to below. It is assumed that the eyes of an average operator sitting in the driver's seat are located in the region of the eye point EP, for example, such that the eye point AP is located between the operator's eyes. The eye point AP may therefore be used as a reference for the view of an average operator from the driver's seat.

However, simply moving the driver's seat is often not enough to enable satisfactory orientation for the driver here. Against this background, it is therefore already known in the prior art to arrange so-called bearing rods on the tandem roller, which enable the driver to take a bearing, from the operator platform, on the ground lying in front of the tandem roller in the direction of travel at a point which is aligned with the respective end face of the respective compaction drum in the direction of travel. However, the use of these bearing rods is relatively complex, as they require individual and difficult adjustment by the respective operator before the start of working operation. In addition to the increased effort involved in the adjustment process, bearing rods are also disadvantageous in that they wobble, especially when the tandem roller is vibrating, and therefore allow only extremely inaccurate and, in the long term, unpleasant bearing for the operator.

SUMMARY

Based on this, it is the object of the invention to provide a simple but at the same time reliable way of making it easier for the driver to estimate the position of the end face of a drum of a tandem roller on the underlying ground from the driving position and, in particular, to provide an improved way for an operator of a tandem roller to guide a tandem roller along an edge of the working area.

The object is achieved with a tandem roller according to the independent claim. Preferred embodiments are cited in the dependent claims.

A generic tandem roller for compacting an underlying ground comprises a machine frame supported by a compaction drum at the front with respect to a direction of travel and a compaction drum at the rear with respect to the direction of travel, wherein the rear compaction drum is spaced apart from the front compaction drum in a longitudinal machine direction, but may in particular be formed and mounted on the machine frame such that it has the same track as the front compaction drum when traveling straight ahead. The direction of travel indicates the current direction of movement of the tandem roller. It may be a forward direction or a rearward direction opposite to the forward direction. Another essential component of a generic tandem roller is an operator platform with a driver's seat oriented in the respective direction of travel, the driver's seat being displaceable by means of an adjusting device from an operating position ("center position") at a center of the operator platform with respect to the horizontal extension of the operator platform transverse to a forward direction, in the direction of at least one side of the tandem roller transverse to the longitudinal machine direction or direction of travel to at least one defined first operating position ("first displacement position") and in the same direction to said side to at least one defined second operating position ("second displacement position"). The defined second operating position is thus horizontally and transversely to the direction of travel farther away from the center of the operator platform than the defined first operating position. However, the defined first and second operating positions are offset from the center position to the same side, i.e., to the right or left side of the operator platform. In the first and in the second defined operating position of the driver's seat, an operator sitting in the driver's seat looks in each case in the direction of travel, i.e., in the forward direction or the rearward direction depending on a rotational position of the driver's seat. What is essential is that the defined first and the defined second operating position do not differ with regard to the position of rotation and the direction of view of the driver from the driver's cab to the front or rear of the tandem roller. The driver's viewing position is determined by the standardized eye point according to the standards mentioned above.

To achieve the object, it is now essential that the tandem roller has at least two direction finding aids, the at least two direction finding aids being arranged offset from each other in a projection to a common virtual horizontal plane, the first direction finding aid being associated with the defined first operating position and the second direction finding aid being associated with the defined second operating position, such that the first direction finding aid for an operator sitting in the driver's seat located in the first operating position and the second direction finding aid for the operator sitting in the driver's seat located in the second operating position each indicate a ground point in line-of-sight extension from the driver's seat, which, viewed parallel to the direction of travel, is in each case located in linear extension of the end-face ground contact point of that end face of the compaction drum located at the front in the direction of travel which is located in the direction of the adjustment direction of the driver's seat from the defined first operating position in the direction of the defined second operating position of the driver's seat. With the aid of the first and second direction finding aids, the operator sitting in the driver's seat can thus identify a point or position on the ground that lies in extension in the direction of travel to an end face of the front compaction drum. When driving straight ahead, they will therefore only pass this point if the tandem roller continues to move in the direction of travel. The point is thus located in front of the tandem roller in the direction of travel and moves with it. In other words, a visual beam from the eye point of the operator located in the driver's seat hits the ground via or along the direction finding aid associated with the respective defined seat position at this ground point. The respective direction finding aid and the defined operating position associated with this direction finding aid are aligned in such a way that this point lies on an extension of the end face or the end-face ground contact point of the drum on the underlying ground parallel to the straight-ahead direction of the tandem roller. This can be determined experimentally or by calculation. The direction finding aids therefore make it easier for the driver to estimate whether he needs to bring the tandem roller even closer to a longitudinally extended obstacle running next to the tandem roller, such as a gutter or an edge of an asphalt mat, or whether he has a position that already optimally approaches this edge or even overlaps this edge. For this purpose, the first and direction finding aids are arranged on the tandem roller such that this aim is arranged on a tandem roller standing on a planar and horizontally extending plane as well as on the SIP or the eye point according to the standards mentioned at the beginning. A defined operating position of the driver's seat refers to a distinct position of the operating seat within the operator platform, in particular the driver's cab, which can be defined by the measures specified in more detail below. It is important that each of the at least two defined operating positions has its own associated direction finding aid in order to take into account the changes in the viewing perspective of the driver located in the driver's seat relative to the respective end face of the compaction drum resulting from the seat displacement. If the operator thus takes a bearing via the first direction finding aid with the driver's seat in the first defined operating position, he can identify a ground point which is essentially at the level of that end face of the compaction drum to which the driver's seat is displaced from the center of the operator platform and which will be passed by the tandem roller but not passed over if the tandem roller continues to move in a straight-ahead direction in the direction of travel. The second direction finding aid is configured accordingly for identifying such a ground point when the driver's seat is in the defined second operating position. The ground points that can be determined with the two direction finding aids may be superimposed on each other, but may also be apart. What is essential is that the ground point is located a few meters, especially in the range of 2-10 m, in front of the tandem roller in the direction of travel to enable expedient bearing from the driver's seat.

The at least first and the at least second direction finding aids together are thus based on a direction of travel (forward or rearward direction) and a lateral adjustment of the driver's seat starting from the center of the operator platform (i.e., to the right or to the left side of the tandem roller). It will be appreciated that further direction finding aids may be present on the tandem roller in a corresponding manner for both sides and/or both directions of travel. If there is a corresponding set of direction finding aids for each side in each direction of travel, the tandem roller then comprises a total of eight direction finding aids. For the sake of simplicity, only the orientation of the driver's seat in one direction of travel and to one side is described in more detail below. Additionally or alternatively, this also applies to the other orientations of the driver's seat.

Regardless of the specific position and configuration of the at least two direction finding aids, it is preferred according to the invention that the at least two direction finding aids are attached to the tandem roller in a stationary manner and are therefore not adjustable in terms of their position and/or shape. Ideally, the at least two direction finding aids are integrated into an existing structure forming an outer surface of the ground compaction machine, such as the machine frame, a cover hood, a chassis, in particular a mounting arm and/or crossbeam, or the like, in particular integrally. In this case, no additional equipment is required and the direction finding aids can be integrated in an extremely robust manner into existing structures of the tandem roller, especially ex works. There is no need for any adjustment work in the field. Due to the integral configuration of the direction finding aid with a component of the tandem roller, in particular a frame element, a cover hood, a part of the chassis, etc., the direction finding aid thus only vibrates together with the overall machine, and thus considerably less than is the case with conventional separate bearing rods. Generally, one or both direction finding aids may also be arranged on the front or rear windshield.

Generally, the at least first and the at least second direction finding aids may be arranged on the tandem roller in the region in front of the operator in the direction of travel when sitting in the driver's seat. However, the bearing for the driver is particularly reliable if at least one of the at least two, and preferably both of the at least two, direction finding aids emerge from the perspective of the operator sitting on the driver's seat, as seen in the longitudinal machine direction or in the direction of travel of the tandem roller, on a visual edge of the tandem roller at the front in a straight-ahead direction of travel, and/or extend to this visual edge. In the present context, the visual edge thus designates the front edge of the machine that is visible to the operator in the driver's seat in the current direction of travel. A direction finding aid that extends to the visual edge has the advantage that, in the driver's field of vision, it merges directly with the underlying ground located ahead in the direction of travel, thus enabling direct bearing without any interrupting structures between the direction finding aid and the ground point to be born. The direction finding aid preferably further emerges in the visual edge if it has, for example, a deformation shaped as a notch or material thickening, such that a slight and clearly recognizable structure is obtained in the visual edge itself. Alternatively, a structure extending toward the visual edge from the driver and/or a structure terminating with the visual edge, such as an intersection point or the like, is also advantageous.

In tandem rollers, the compaction drums are often mounted on the machine frame via a fork-like structure. Toward each of the two opposite end faces of the drum, this mounting structure comprises a respective mounting arm coming from above, which supports a rotary bearing for the compaction drum. The mounting arms may be arranged on a crossbeam parallel to the rotation axis of the compaction drum and spanning the latter essentially over its axial longitudinal extension. In the case of pivot-steered tandem rollers, this crossbeam is mounted on a pivot bearing such that it can rotate about a vertical axis; in the case of tandem rollers with articulated steering, on the other hand, this crossbeam is usually stationary relative to the front or rear carriage connected via the articulated joint. Frequently, this crossbeam of the support structure for the drums thus forms the front structural end in the direction of travel and, in this region, also the upper structural end of the tandem roller, and thus frequently also at least partially the visual edge of the ground compaction machine for the driver. For this reason alone, the crossbeam is particularly suitable for arranging and forming at least one and preferably both direction finding aids. A cover hood and/or the mounting arm may also preferably be used to arrange and form one of the direction finding aids.

It is advantageous if, from a perspective of the operator sitting on the driver's seat, the at least two direction finding aids are arranged in line-of-sight extension from the driver's seat in the direction of travel in front of the operator, preferably in front of or on the front windshield, particularly preferably in front of a horizontal rotation axis of the compaction drum, and most preferably at least at the visual edge of the tandem roller. The farther away the direction finding aids are from the driver and/or the closer they are arranged toward the visual edge, the more precisely the operator can control the tandem roller from the driver's seat via the direction finding aids. Generally, it is therefore possible to arrange one or more of the direction finding aids directly on the front windshield. However, it is better to place the direction finding aids farther away from the operator and arrange them at points on the tandem roller remote from the operator. As already mentioned, it is optimal to form the direction finding aids such that they extend at least as far as the visual edge and/or to integrate them directly into the visual edge, for example as a structural elevation and/or depression.

If at least one of the two direction finding aids has a linearly extending bearing line starting from an eye point of the driver and emerging from the machine environment immediately adjacent to it, bearing is further facilitated for the operator, as it is more convenient, comparable to an arrow pointing the way, to take a bearing on the environment lying ahead of the tandem roller via an extension of a visible straight line than, for example, via a direction finding aid recognizable only at one point. For this reason, it is therefore also preferred that both direction finding aids have a respective bearing line. The direction finding aids may basically run parallel to each other, although this results in an inaccuracy—which, however, is usually acceptable—due to the changing viewing perspectives between the two defined operating positions. However, these different viewing perspectives can also be taken into account in that it is also possible to form the at least partially linearly extended two direction finding aids such that, when projected into a common virtual horizontal plane, they run at an angle to one another, in particular less than 5°, and/or run at an angle to the straight-ahead direction.

With regard to the specific configuration of one or both of the at least two direction finding aids, a wide range of variations may be used. What is essential is that, on the one hand, the operator can recognize the direction finding aid as clearly as possible, i.e., distinguish it from the machine environment adjacent to the direction finding aid and, on the other hand, it is as easy to produce and robust as possible. In this regard, it has proven advantageous, for example, if at least one of the at least two direction finding aids emerges as an elevation and/or depression relative to the machine region adjacent to the respective direction finding aid. This can be achieved, for example, by specific material bulges, component joints and/or material depressions, such as milled recesses. If a joint is used for this purpose, it may also have a local widening of the joint, i.e., the width of the joint ("gap width") extending transversely to the longitudinal extension of the joint may be at least transitionally widened. As a result, this special joint with dual functions (component joint and direction finding aids) can be specifically distinguished from other, for example, adjacent component joints, and can also be better recognized by operators and used for bearing purposes. Furthermore, by widening the joint, a shadow contrast can be achieved even if this region is monochrome, which additionally facilitates identification of the joint relevant for bearing purposes. Additionally or alternatively, the direction finding aid may have a chromatic contrast relative to the machine region adjacent to the respective direction finding aid, in particular by means of a sticker and/or a colored paint mark. Additionally or alternatively, it may further be part of at least one opening penetrating the outer surface of the tandem roller, in particular in the region of a crossbeam for mounting one of the compaction drums, and/or be part of a material thickening and/or material recess. It may also be part of an access and/or reach-through opening, particularly to a drum sprinkling device and/or a stripping device.

An essential aspect of the invention is that the driver's seat can be brought exactly into the position ("defined position") required for correct alignment of the driver's seat with the respective direction finding aid, for example in order to be able to exclude erroneous bearing. It is therefore advantageous if an alignment aid is provided for at least one and preferably both of the at least two direction finding aids in order to ensure exact coordination of the position of the driver's seat for the respective direction finding aid in at least one defined operating position. The alignment aid thus makes it possible to define a positioning of the driver's seat in the defined first operating position and/or in the defined second operating position. Generally, optical marks or the like may be provided here in some form to enable the operator to correctly align the driver's seat. Acoustic and/or haptically perceptible signals, suitable sensor devices, etc. are also generally possible.

Additionally or alternatively, however, the alignment aid preferably comprises a stop in the adjustment path of the driver's seat from the center in the direction of the first and/or second defined operating position, against which the driver's seat or an element adjustable together with the driver's seat abuts when the driver's seat has reached its defined first and/or defined second operating position. A respective stop may be present for each of the first and second defined operating positions, wherein the stop defining the first operating position is preferably removable or releasable by the driver, in particular manually, from the adjustment path of the driver's seat in the direction from the first defined operating position toward the second defined operating position. The stop defining the defined first operating position may be arranged stationary in relation to a side window of the tandem roller that can be adjusted between a closed position and an open position, and/or the stop defining the defined second operating position may be formed by the maximum adjustment path of the adjustment device of the driver's seat and/or by a sidewall stop. In addition or as an alternative to a mechanically acting alignment aid, at least one optical mark may also be present in the driver's cab to indicate to the driver that the defined first and/or second operating position has been reached. The essential function of the alignment aid is to ensure reliable and repeatable positioning of the driver's seat in the defined adjustment position of the driver's seat associated with the respective direction finding aid (defined first and second operating position). These two seat positions are not freely selectable by the driver, but are ultimately clearly defined by the position of the at least two direction finding aids on the tandem roller.

Since more than one direction finding aid is to be used for each side of the driver's seat, it may be difficult, especially for inexperienced operators, to associate the respective direction finding aid with the correct seat operating position. In this regard, it has proven advantageous to have an associating aid, in particular on the operator platform, which indicates to the operator in the driver's seat which of the at least two direction finding aids is associated with which of the defined first and/or second operating positions. Because the direction finding aids are not adjustable relative to the rest of the machine and, in particular, are formed integrally with, for example, a frame component or other machine component, the direction finding aids always have the same appearance and can always be identified at the same point on the tandem roller. One way of making it easier for the operator to associate the respective direction finding aid may therefore be, for example, to indicate to the driver via an operator display whether the driver's seat is currently in a defined operating position and/or which direction finding aids are present and/or which direction finding aid is associated with the current seat position. It is even possible to show the operator sitting in the driver's seat the viewing perspective via the respective direction finding aid in the display (even from "his" viewing perspective), which enables particularly fast association for the operator. Additionally or alternatively, there may of course also be corresponding representations and/or color coding, for example of the direction finding aids themselves and/or inside the driver's cab, for example depending on the position of an adjustment slide of the driver's seat or the like, such as position indicators, etc.

Generic tandem rollers may include optional additional units, such as grit spreaders or so-called edge cutters. Such an edge cutter is described in more detail, for example, in EP2357281A2, which is herewith incorporated by reference. The purpose of an edge cutter (whether it has a cutting or pressure roller) is to accurately shape and/or cut the edge of an asphalt mat. For this purpose, the edge cutter has a working roller which can be lowered into the ground when the edge cutter is in use and which presses against and/or cuts the edge of the asphalt mat in the axial direction of the compaction drum on the end face side next to the compaction drum. The cutting direction or cutting edge of the edge cutter thus runs offset in the axial direction to the end face of the respective compaction drum. It is therefore preferable for the tandem roller to have an additional direction finding aid associated with a defined operating position of the driver's seat (which may in particular be the defined second operating position) for the cutting edge profile of an edge cutter. This at least one further direction finding aid is thus associated with the cutting edge of an edge cutter, in particular exclusively for the driver's seat located in the second operating position. In this case, too, the direction finding aid is configured and positioned on the tandem roller such that it indicates a ground point in line-of-sight extension from the driver's seat, which is located, as seen parallel to the forward direction in the direction of travel, in linear extension of the cutting edge of a cutting wheel of the edge cutter.

The invention is equally suitable for articulated as well as for pivot-steered tandem rollers. These may have a crab steering mode. In particular for such tandem rollers, at least one additional direction finding aid may be provided, which is associated with the defined first and/or the defined second operating position specifically for a movement of the tandem roller in a crab steering mode.

BRIEF DESCRIPTION OF THE DRAWINGS

The invention will be explained in more detail below by reference to the embodiment examples shown in the figures. In the schematic figures:

FIG. 5: shows a viewing perspective from the operator platform.

DETAILED DESCRIPTION

Figure 1:
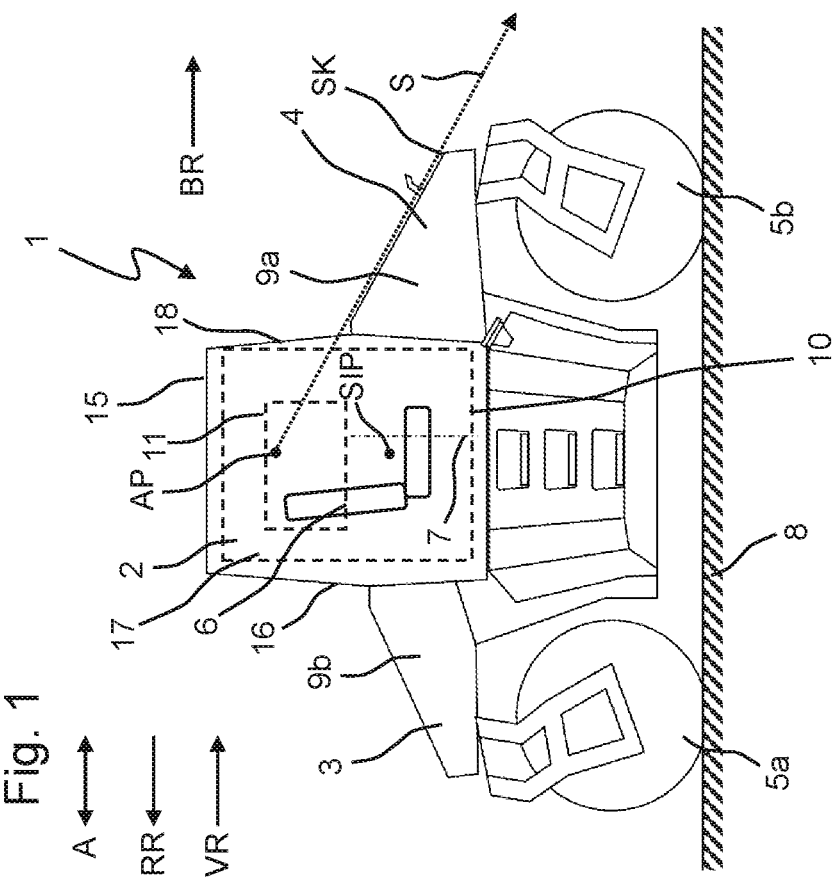
FIG. 1: is a side view of a pivot-steered tandem roller.

Like parts or functionally like parts are designated by like reference numerals in the figures. Recurring parts are not designated separately in each figure.

FIG. 1 shows a schematic side view of a tandem roller 1, in this specific example a road roller, in particular a pivot-steered tandem roller. However, the roller may also be an articulated tandem roller. The tandem roller 1 typically comprises a machine frame 3 supported by a travel mechanism, which preferably has a front or first compaction drum 5a and a rear or second compaction drum 5b. Generally, for example, one or both of the compaction drums 5a, 5b, which are in the present case configured as smooth drums, may also be replaced by wheel sets with at least three rubber wheels arranged coaxially to one another or by drums with structured circumferential surfaces (padfoot, polygon). The compaction drums 5a and 5b may also comprise two or more partial drums per compaction drum. During working operation, the ground compaction machine 1 with the compaction drums 5a, 5b is typically driven over a ground 8, for example an asphalt mat, thereby compacting it.

The ground compaction machine 1 preferably comprises an operator platform, for example in the form of a driver's cab 2, which is typically supported by the machine frame 3 and is arranged, for example, in a longitudinal machine direction A between the compaction drums 5a, 5b. The driver's cab 2 may have a roof 15 that delimits the driver's cab 2 upward in the vertical direction (the roof 15 is not shown in FIGS. 2 to 4 for reasons of clarity). Moreover, the operator's cab preferably comprises sidewalls 17, which are spaced apart from one another, for example, transversely to the longitudinal machine direction of the machine a, and laterally delimit the driver's cab 2. In a forward direction VR, the driver's cab 2 is typically delimited by a front wall 16, while in a rearward direction RR it is preferably closed off by a rear wall 18. The roof 15, the sidewalls 17 as well as the front wall 16 and the rear wall 18 may include windows or window surfaces or even consist for the most part of window surfaces, for example glass panes. The driver's cab 2 therefore preferably also has at least one front windshield and one rear windshield. Also, part of the driver's cab 2 are two side doors 10 (10R on the right side of the tandem roller 1 as seen in the direction VR and 10L on the left side as seen in the direction VR). These side doors 10 can be opened from a closed position to allow access to the interior of the driver's cab from the outside. Part of each of the side doors 10R and 10L may be a side window 11, which may likewise be openable and closable independently of the rest of the side door.

A driver's seat 6 is preferably arranged in the interior of the driver's cab 2, which may in particular be configured rotatable about a vertical rotation axis 7. Preferably, the driver's seat 6 can be rotated about the seat rotation axis 7 by at least 180° and, in particular, adjusted, especially rotated, between a forward position and a rearward position. In the example shown in FIG. 1, the driver's seat 6 is shown, for example, in the forward position, i.e., a driver sitting in the driver's seat 6 and looking forward from his position is in this case looking in the forward direction VR of the machine. Preferably, the driver's seat 6 is in the forward position when the ground compaction machine 1 is operated or driven in the forward direction VR, while the driver's seat 6 is preferably in a rearward position rotated by 180° when the ground compaction machine 1 is operated or driven in the rearward direction RR. The position of the driver's seat 6 in the forward or rearward position also determines the viewing direction BR of an operator sitting on the driver's seat 6. In the forward position, the viewing direction BR of the operator sitting on the driver's seat 6 preferably corresponds to the forward direction VR, while the viewing direction BR of the operator sitting on the driver's seat 6 corresponds to the rearward direction RR when the driver's seat 6 is in the rearward position. In order to make the present description as simple as possible, preferably, the forward direction VR, the rearward direction RR and the viewing direction BR of the operator are always parallel to the longitudinal machine direction a. The direction of travel is assumed to be straight ahead (thus parallel to the longitudinal direction a).

As described above, the ground compaction machine 1 can be operated both forward and rearward. During operation in the forward direction VR, the front compaction drum 5a in particular then moves ahead of the rear compaction drum 5b. In contrast, during operation in the rearward direction RR, the rear compaction drum 5b in particular would travel ahead of the front compaction drum 5a. In the present embodiment example, the ground compaction machine 1 comprises a front or first hood 9a, which is in particular arranged, as seen from the driver's cab 2, in the forward direction VR, and typically furthermore a rear or second hood 9b, which is in particular arranged, as seen from the driver's cab 2, in the rearward direction RR. The hoods 9a, 9b preferably form parts of the outer contour of the machine and typically at least partially enclose compartments of the ground compaction machine 1 in which various other devices may be provided. For example, a liquid tank, such as for water, may be arranged under the front hood 9b, the liquid stored in the tank being used, for example, for spraying the compaction drums 5a, 5b. In particular, a ventilation and exhaust system of a drive motor 4 of the ground compaction machine 1 is preferably arranged under the rear hood 9a. The drive motor 4 may be, for example, an internal combustion engine or an electric motor. Moreover, it is also possible, for example, for the hoods 9a, 9b per se to have different configurations. The viewing direction BR of an operator now depends on the position of the driver's seat 6 and the direction in which the ground compaction machine 1 is currently to be operated.

Figure 2:
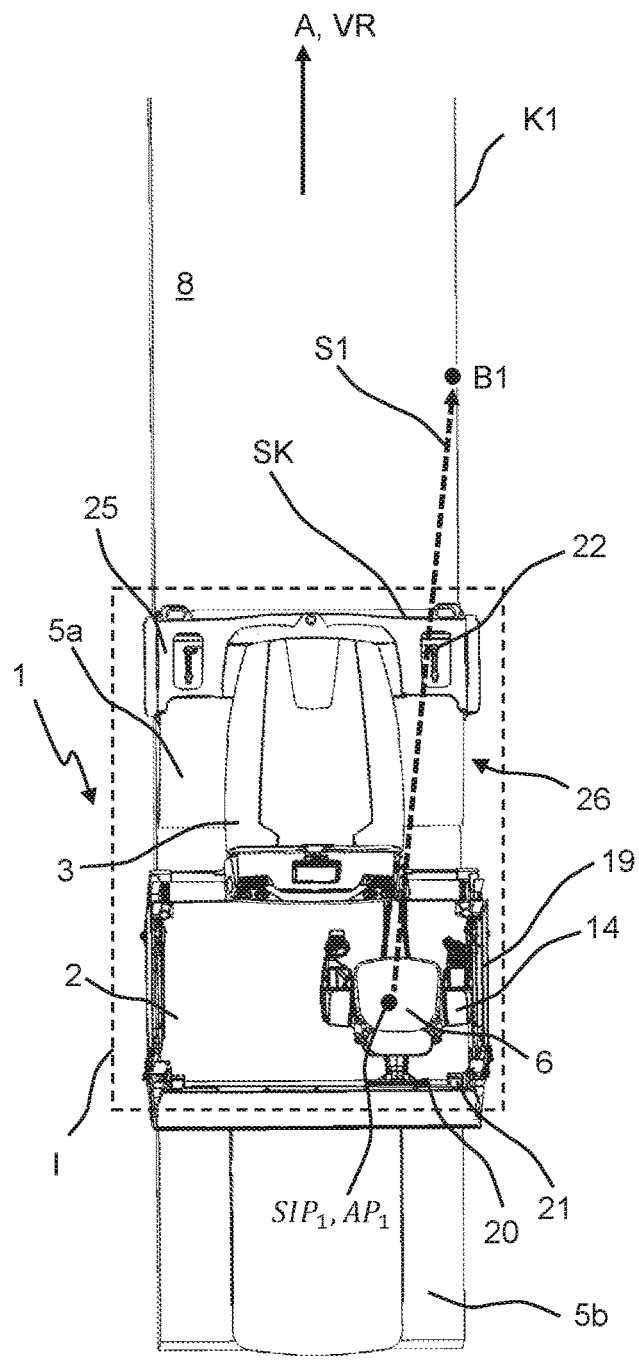
FIG. 2: is a top view of a tandem roller with a driver's seat in a first defined operating position.
Figure 4:
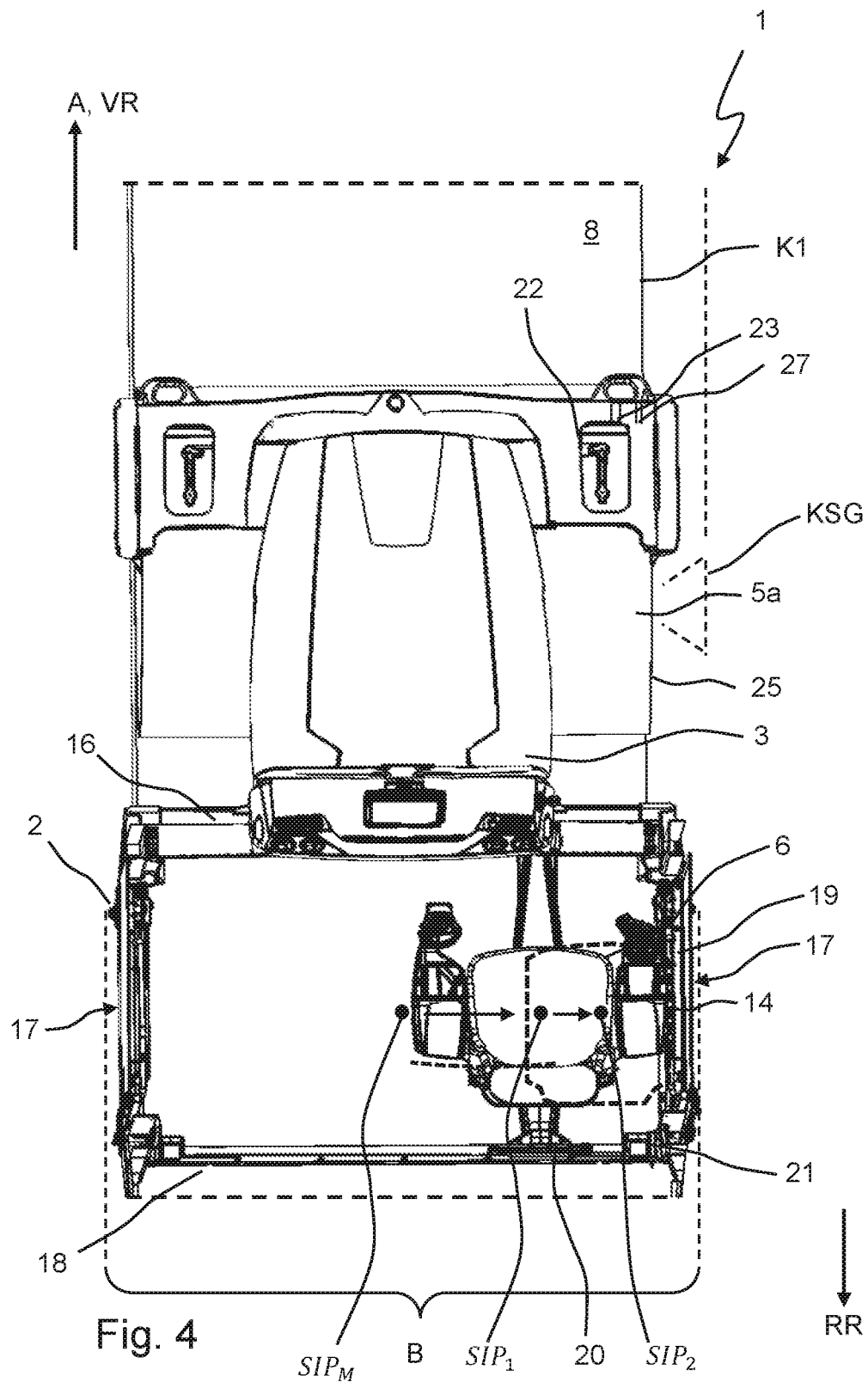
FIG. 4: is an enlarged view of the region I of FIG. 2.

In order to objectively determine the viewing conditions for an operator of the tandem roller 1 sitting in the driver's seat 6, the preferred reference for the seat position is the seat index point SIP according to the EN ISO 5353 standard, which can be unambiguously determined according to the specifications of this standard and is given in FIGS. 1 and 2 as an example for the present embodiment example. The seat index point SIP is preferably spaced apart from the rotation axis 7 of the driver's seat 6, for example in the radial direction of the rotation axis 7, i.e., in a horizontal direction. Starting from the seat index point SIP, the eye point AP is determined, which is preferably located 680 mm vertically above the seat index point SIP. This is defined accordingly in the ISO 5006 2017-04 standard. It is assumed that the eyes of an average operator sitting in the driver's seat 6 are located in the region of the eye point EP, for example, such that the eye point AP is located between the operator's eyes. The eye point AP may therefore be used as a reference for the view of an average operator from the driver's seat 6. Further, a center position of the driver's seat 6 is assumed to define the displacement position of the driver's seat to be assumed here. This central position of the driver's seat 6 is present when the driver's seat is positioned with respect to its SIP in the center of the maximum extension of the operator platform or driver's cab 2 in a horizontal reference plane and transverse to the forward direction VR (FIG. 4). This position is indicated by "SIPm" in FIG. 4. Additionally or alternatively, it may also be defined by the center with respect to the total adjustment path of the driver's seat 6 within the driver's cab.

In FIG. 1, S further indicates a visual beam starting from the eye point AP and spaced 680 mm upward from the SIP on a vertical axis. As can be seen, the operator sitting in the driver's seat 6 is looking over the machine toward the front from his position, with part of the machine being in his field of vision. The front end or the front edge of the tandem roller visible to the operator in this situation forms the visual edge SK. Below the visual edge, the driver can usually see a part of the machine. Above the visual edge, the driver sees a region ahead of the machine in the direction of travel of the tandem roller, usually a ground area, lying a few meters ahead of the machine. This circumstance is now specifically used in the manner described below to facilitate positioning of the machine relative to a side obstacle running in the longitudinal machine direction, such as the side edge of an asphalt mat and/or a gutter or curb.

Figure 3:
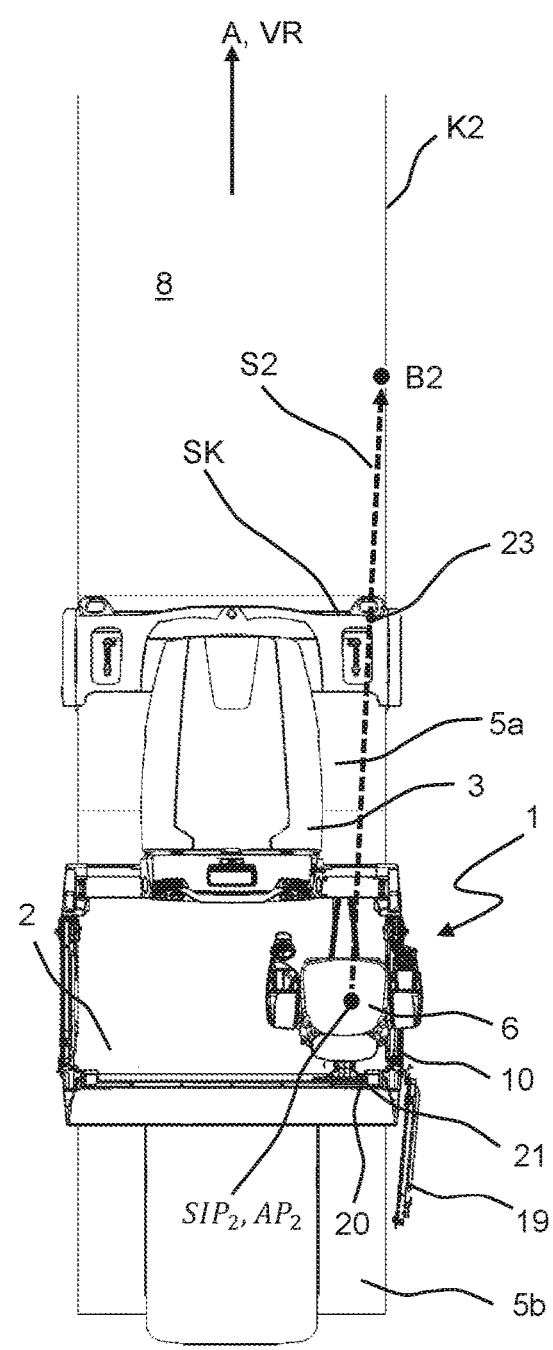
FIG. 3: is a top view of the tandem roller of FIG. 2 with a driver's seat located in a second defined operating position.

According to a first essential aspect in this regard, the driver's seat 6 can be brought into a defined first operating position and into a defined second operating position. In the top view according to FIG. 2, the driver's seat 6 is in a defined first operating position displaced from the center position to the right side as viewed in the forward direction VR. FIG. 3, on the other hand, shows the driver's seat 6 in a defined second operating position. In the defined second operating position, the driver's seat 6 is displaced even further to the side from the center of the operator platform compared to the defined first operating position. The operating positions shown in FIGS. 2 and 3 are defined in that an alignment aid 13 may be provided for each of the two operating positions to ensure that the driver's seat 6 is in the first or the second operating position when it is adjusted. In the present embodiment example, the alignment aid 13 may be in the form of a stop 13A associated with the first operating position and a stop 13B associated with the second operating position. The stop 13A is formed by a stopping of an outer side of an armrest 14 located in front of the seat surface of the driver's seat 6 in the direction of displacement from the center position and the inner side of a handle element 19. The handle element is part of the side window 11 and thus adjustable together with the side window. Accordingly, the driver's seat 6 is in its first defined operating position when the armrest 14 of the driver's seat 6 abuts the handle element 19 of the closed side window 11 when the side door 10 is closed. This stop thus represents an adjustment path limitation acting in the direction of the adjustment movement away from the center position. In practical use, the driver can thus release a, for example continuous, seat adjustment as is known per se from the prior art, move the driver's seat 6 until reaching the stop described above and then lock the driver's seat 6 in this position. The driver's seat 6 is then reliably in the defined first operating position. The defined second operating position, on the other hand, may be formed by a stop of, for example, an adjustment slide 20 on a guide rail 21, as shown in FIG. 3. However, it is important to note that in the present embodiment example, irrespective of specific embodiment details, the alignment aid may be configured such that the defined second operating position can only be set if the first defined operating position lying in front of it with regard to the adjustment movement of the driver's seat 6 from the center of the operator platform can be overcome. For this purpose, in the present embodiment example, it may be necessary to first release the first alignment aid, for example specifically to adjust the window from the closed position in FIG. 2 to an open position, such as the position pivoted backward by essentially 180° as seen in FIG. 3. In this manner, the part that stops against the armrest 14 due to the handle element 19 in the side window 11 is removed from the adjustment path, so that the driver's seat 6 can now be moved beyond the defined first operating position to the defined second operating position.

The stops described for both defined operating positions of the driver's seat ensure that the generally adjustable driver's seat assumes a specific position relative to the rest of the tandem roller in each case and thus, in particular, the viewing perspective achieved for a person in the driver's seat 6 is defined or fixed. Only in this way is it possible to arrange bearing aids for each of the two defined operating positions in the driver's field of vision on the tandem roller such that he can take a comparatively precise bearing from the respective defined operating position on an end-face ground point in order to be able to guide the tandem roller 1 as precisely as possible along obstacles lying and/or extending next to the tandem roller.

The principle underlying this effect is further illustrated by FIGS. 2 and 3. In FIGS. 2 and 3, S1 indicates the visual beam starting from the seat index point SIP1 given in the defined first operating position, and S2 indicates the visual beam starting from the seat index point SIP2 given in the defined second operating position. Thus, in FIGS. 2 and 3, respectively, the visual beams S1 and S2 start from the eye point AP1 and AP2, which are located 680 mm vertically above SIP1/SIP2. FIGS. 2 and 3 further show a side edge K1 of an asphalt mat on which the tandem roller 1 stands. In the present embodiment example, the driver is supposed to drive as precisely as possible along the edge K1 without driving over the edge K1 with the right-hand end face of the compaction drums 5A and 5B in the present example. The direction finding aids 22 and 23 assist him in doing so. The direction finding aid 22 is associated with the defined first seat position and AP1, and the direction finding aid 23 is associated with the defined second seat position and AP2. The direction finding aid 22 is formed by the inner edge, extending in the forward direction VR, of an opening in the outer surface of a mounting crossbeam 25. This opening can be used to access, for example for maintenance purposes, a stripping device located underneath and/or a drum sprinkling device and/or a light plug and/or a hose holder. This opening 24 is now precisely positioned on the crossbeam such that the operator, who is in the driver's seat 6, looks forward from the eye point AP1 along the direction finding aids 22. The ground point B1, which from his perspective lies in direct extension of the direction finding aids 22, is located in straight-line extension of the end face 26 of the drum 5A in forward direction VR. If the operator of the tandem roller 1 thus makes sure during traveling operation that the ground point B1, as born starting from AP1 via 22, moves along the side edge K1, he can be sure that the end face 25 of the drum 5A (and ultimately also of the following drum 5B) is guided comparatively exactly on the asphalt mat close to the side edge K1 without overlapping the latter. The same applies to the direction finding aid 23, which is associated in a corresponding manner with the defined second seat position, or the eye point AP2. The direction finding aid 23 is offset from the direction finding aid 22 horizontally and transversely to the forward direction to the outside of the tandem roller. This is necessary because the relative position of the operator to the rest of the tandem roller and ultimately also to the course of the side edge K1 changes between the defined first operating position and the defined second operating position. In the present case, the direction finding aid 23 is formed, by way of example, by a material elevation in the region of the crossbeam 25. The material elevation (or material depression) extends into the front visual edge SK and is thus easily recognizable by the operator, in particular because the elevation (or depression) can be clearly distinguished from the region of the visual edge adjacent to it. Generally, the number of direction finding aids and/or the specific configuration of the direction finding aids can be varied in many ways. However, the key aspect essential for the invention is that, on the one hand, the adjustability of the driver's seat 6 in defined operating positions is ensured (since the direction finding aids are arranged stationary on the tandem roller and thus cannot be adjusted) and, coordinated with these individual operating positions, a direction finding aid is provided in each case which specifically indicates the position of the end face of a drum in the field of view for the driver in front of the tandem roller on the ground. Moreover, it is essential that, on the other hand, the respective direction finding aid is fixedly and non-adjustably connected to the rest of the tandem roller, in particular integrally and solidly formed with one or more frame elements or other parts of the tandem roller 1 forming the outer surface. For this purpose, grooves, color marks, milled recesses, notches, material thickenings, surface patterns, etc. may be used. It is ideal if the direction finding aid is configured such that it extends linearly in the direction of the respective visual beam S1/S2, particularly preferably into the driver's visual edge SK.

The enlarged section according to FIG. 4, which shows the enlarged region I of FIG. 2, illustrates in particular the relative position of the defined first operating position and the defined second operating position with respect to the center position (SIPm) as well as the corresponding offset of the direction finding aids 22 and 23. For tandem rollers, it is further known to configure one or more drums at their end face with a so-called edge cutter. Such an edge cutter KSG is disclosed, for example, in EP2357281A2. A further direction finding aid 27 may now be provided which is associated with a defined operating position of the driver's seat and with which the driver can take a bearing specifically on the cutting edge of the edge cutter.

Finally, FIG. 5 illustrates the effect of the arrangement according to the invention and shows the viewing perspective of an operator sitting in the driver's seat 6 inside a driver's cab 2. The driver's seat 6 is in a defined operating position and the driver's visual beam originates from a standardized eye point above a seat index point, as explained in the preceding figures. The tandem roller stands on an asphalt mat of the underlying ground 8 and compacts it straight along a gutter 28. The asphalt mat extends with its side edge K1 horizontally and transversely to the forward direction to immediately adjacent to the gutter 28. The operator can now look out of the operator's cab in the forward direction A and guide the movement of the machine by taking a bearing via the direction finding aid 22. The direction finding aid 22 is arranged as an extension of an opening 24 such that its virtual extension starting from the driver extends to the visual edge, which in the present case is formed by a crossbeam 25. Where this mark formed by the direction finding aid 22 merges in the driver's field of vision with the ground lying ahead of the tandem roller 1 is the extension of the end face (in the picture according to FIG. 5 the right end face of the front drum 5A). As long as the machine travels straight-ahead, the driver thus only needs to take care to guide the tandem roller with the direction finding aid 22 along the edge K1, and can then be sure that the drum 5A is guided close to the gutter 28 without hitting it.

FIGS. 2 to 4 are two-dimensional top views of the tandem roller 1. It will be appreciated that this means that perspective subtleties cannot be represented mathematically exactly in some cases. What is essential is the illustration of the principle explained above for taking bearings from the operator platform on one of the two outer extensions of the end faces of the front drum in the direction of travel.

FIG. 5 further shows another direction finding aid 23 in the form of a component joint between a crossbeam and a drum mounting arm. FIG. 5 illustrates that the optical contrast to regions adjacent to these direction finding aids 23 can be emphasized more strongly by means of a deliberately introduced transitional joint widening 29. In the present case of FIG. 5, the operator does not (yet) use the direction finding aids 23 as long as the driver's seat 6 is not in the defined operating position associated with these direction finding aids 23. Said position is reached when the driver has shifted further toward the (in the present case right) side into his defined seat operating position provided there, which is defined for example by a mechanical stop. This direction finding aid 23 also extends into the front visual edge SK, so that the operator sitting in the driver's seat can take a particularly precise bearing of the ground area here.

What is claimed is:

1. A tandem roller to compact an underlying ground, comprising:
    a machine frame supported by a front compaction drum with respect to a direction of travel and a rear compaction drum with respect to the direction of travel, the rear compaction drum being spaced apart from the front compaction drum in a longitudinal machine direction; and
    an operator platform with a driver's seat oriented in the direction of travel, the driver's seat being displaceable by an adjusting device from an operating position at a center of the operator platform with respect to a horizontal extension of the operator platform transverse to the direction of travel in a direction of at least one side of the tandem roller transversely to the longitudinal machine direction to at least one defined first operating position and to at least one defined second operating position, the defined second operating position being spaced farther apart from the center of the operator platform than the defined first operating position, wherein, in the first and the second defined operating position of the driver's seat, an operator sitting in the driver's seat looks in each case in a direction of the direction of travel,
    wherein the tandem roller has at least first and second direction finding aids, the first and the second direction finding aids being arranged offset from each other in a projection to a common virtual horizontal plane, the first direction finding aid being associated with the defined first operating position and the second direction finding aid being associated with the defined second operating position, such that the first direction finding aid for the operator sitting in the driver's seat located in the first operating position and the second direction finding aid for the operator sitting in the driver's seat located in the second operating position each indicate a ground point in line-of-sight extension from the driver's seat, which, viewed parallel to the direction of travel, is in each case located in linear extension of an end-face ground contact point of an end face of the front compaction drum located at a front of the tandem roller in the direction of travel which is the end face that is located in a direction of the adjustment direction of the driver's seat from the defined first operating position in a direction of the second defined operating position of the driver's seat.

2. The tandem roller according to claim 1, wherein the first and the second direction finding aids, from a perspective of the operator sitting on the driver's seat in the longitudinal machine direction:
    emerge on a visual edge of the tandem roller at the front of the tandem roller in a straight-ahead direction of travel; and/or
    extend to the visual edge of the tandem roller.

3. The tandem roller according to claim 1, wherein the first and the second direction finding aids are arranged on:
    a machine frame; and/or
    a chassis of the front compacting drum; and/or
    a front windshield.

4. The tandem roller according to claim 1, wherein from a perspective of the operator sitting on the driver's seat, the first and the second direction finding aids are arranged in line-of-sight extension from the driver's seat in the direction of travel in front of the operator.

5. The tandem roller according to claim 1, wherein at least one of the first and the second direction finding aids has a linearly extending bearing line starting from an eye point of the driver and emerging from a machine environment immediately adjacent thereto.

6. The tandem roller according to claim 5, wherein the first and the second direction finding aids each have a respective bearing line, the bearing lines running at an angle to one another when projected into a common virtual horizontal plane.

7. The tandem roller according to claim 1, wherein at least one of the first and the second direction finding aids have at least one of the following features:
    the at least one of the first and the second direction finding aids is distinguished from an adjacent machine region by an elevation and/or a notch;
    the at least one of the first and the second direction finding aids comprises a joint;
    the at least one of the first and the second direction finding aids has a chromatic contrast relative to the adjacent machine region;
    the at least one of the first and the second direction finding aids is part of at least one opening penetrating an outer surface of the tandem roller;
    the at least one of the first and the second direction finding aids is part of a material thickening and/or a material recess;
    the at least one of the first and the second direction finding aids is part of an access opening.

8. The tandem roller according to claim 1, wherein an alignment aid is provided which defines a positioning of the driver's seat in at least one of the defined first operating position or the defined second operating position.

9. The tandem roller according to claim 8, wherein the alignment aid comprises a device configured to output at least one optical signal when the driver's seat has reached at least one of the defined first operating position or the defined second operating position.

10. The tandem roller according to claim 8, wherein the alignment aid comprises:
    a stop is provided in an adjustment path of the driver's seat from the center in the direction of at least one of the first or the second defined operating position, against which the driver's seat or an element adjustable together with the driver's seat abuts when the driver's seat has reached the defined first or the defined second operating position.

11. The tandem roller according to claim 1, wherein an associating aid is provided which indicates to the operator in the driver's seat which of the first and the second direction finding aids is associated with the defined first or the defined second operating positions.

12. The tandem roller according to claim 1, wherein the tandem roller has at least one further direction finding aid, which is associated with a cutting edge of an edge cutter.

13. The tandem roller according to claim 1, wherein the tandem roller has a crab steering mode, and at least one further direction finding aid is provided, which is associated with at least one of the defined first or the defined second operating position for movement of the tandem roller in the crab steering mode.

14. The tandem roller according to claim 2, wherein the visual edge of the tandem roller is of a crossbeam of the tandem roller.

15. The tandem roller according to claim 3, wherein at least one of the first and the second direction finding aids is formed by:
the machine frame; and/or
the chassis of the front compacting drum.

16. The tandem roller according to claim 3, wherein at least one of the first and the second direction finding aids is arranged permanently and stationary on:
the machine frame; and/or
the chassis of the front compacting drum; and/or
the front windshield.

17. The tandem roller according to claim 3, wherein the first and the second direction finding aids are arranged permanently and stationary on the machine frame.

18. The tandem roller according to claim 4, wherein at least one of the first and the second direction finding aids is at least one of:
in front of a front windshield;
on the front windshield;
in front of a horizontal rotation axis of the front compaction drum; or
at a visual edge of the tandem roller.

19. The tandem roller according to claim 6, wherein the angle is less than 5°.

20. The tandem roller according to claim 1, wherein the tandem roller is at least one of a road roller, a pivot-steered tandem roller or an articulated tandem roller.

* * * * *